May 15, 1962     P. M. DOSTER     3,034,215
WEDGE ON A TOOTH BAND FOR DISTALLY GUIDING AN ERUPTIVE TOOTH
Filed Nov. 21, 1960
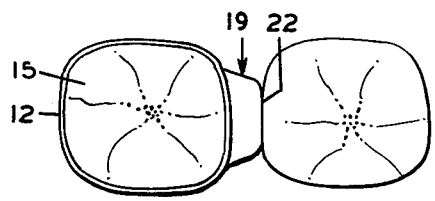
FIGURE 1.
FIGURE 7.
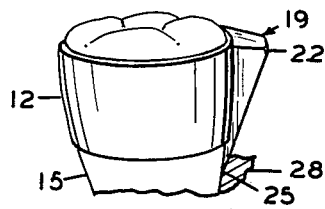
FIGURE 2.
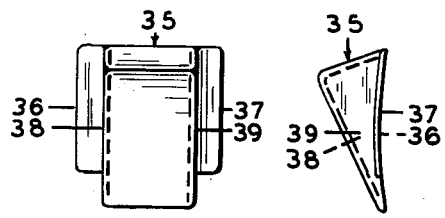
FIGURE 8.    FIGURE 9.
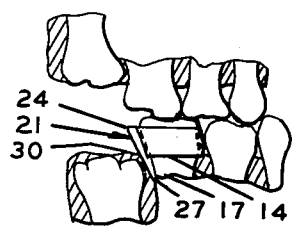
FIGURE 3.    FIGURE 4.
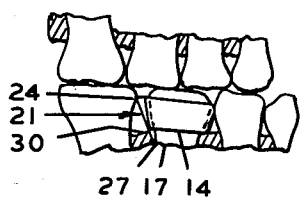
FIGURE 5    FIGURE 6.
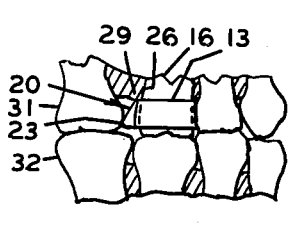
INVENTOR.
PHILIP M. DOSTER
BY
ATTORNEY

United States Patent Office 3,034,215
Patented May 15, 1962

3,034,215
WEDGE ON A TOOTH BAND FOR DISTALLY
GUIDING AN ERUPTIVE TOOTH
Philip M. Doster, Kansas City, Mo.
(95 Grand View, San Francisco, Calif.)
Filed Nov. 21, 1960, Ser. No. 70,518
1 Claim. (Cl. 32—14)

This invention relates to a wedge on a tooth band for distally guiding an eruptive tooth next to the tooth having the tooth band secured thereto, and is applicable to first teeth of children and second teeth of adults and children.

My invention is to secure a wedge member to a tooth band with the thickest portion of the wedge member being located near the distal end portion of a tooth and the thinnest end portion being projected toward the root of the tooth to guide an eruptive tooth next thereto.

Another object of my invention is to provide a wedge member secured to a tooth band securable around a tooth, the thickest portion of the wedge member being near one edge of the tooth band, the opposite thinnest end portion thereof being projected beyond the opposite edge of the tooth band, and adapted to distally guide the growth of a tooth next to the tooth having the tooth band applied thereon.

A still further object of my invention is to provide a wedge member secured transversely to a tooth band adapted to distally guide the growth of an eruptive tooth.

This specification will be more fully understood with reference to the accompanying drawing and the claim appended.

In the drawing:

FIGURE 1 is a plan view illustrating a tooth banded and having my improved wedge member secured thereto. The wedge member is shown to have distally spaced an erupted tooth next thereto.

FIGURE 2 is a perspective view illustrating my improved wedge member secured to a tooth band. A tooth portion is shown with the band thereon.

FIGURE 3 is a view in elevation of a few teeth located in sections of the gum of a person as supported by the jaw bones. The well known jaw bones of a person are not shown. Three upper and three lower teeth are shown with the distal ends meshed together. Two teeth are illustrated beginning to erupt, one above and one below. A tooth band with my improved wedge is secured to an upper tooth with the wedge placed to guide the upper tooth beginning to erupt. The root portions of the teeth and portions of the gum are broken away.

FIGURE 4 is a view similar to FIGURE 3 with the eruptive teeth grown to a desired mesh by guidance of the wedge.

FIGURE 5 is a view similar to FIGURE 3 illustrating the tooth band and wedge placed on a lower tooth.

FIGURE 6 is a view similar to FIGURE 4 illustrating the tooth band and wedge placed on a lower tooth.

FIGURE 7 is a plan view of a detailed wedge member modified with flanges as a means for securing it to a tooth band.

FIGURE 8 is a view of the face of the wedge member illustrated in FIGURE 7.

FIGURE 9 is a view of one side of the wedge member as illustrated in FIGURE 8.

Dentists are well schooled in the art of securing tooth bands on teeth for various purposes.

I illustrate tooth bands 12, 13 and 14 secured to teeth 15, 16 and 17 respectively.

Wedge members 19, 20, and 21 are all similar in structure and preferably illustrated integral with the respective tooth bands 12, 13 and 14.

All wedge members 19, 20 and 21 have the thickest portions 22, 23 and 24 of the respective wedge members located near the distal ends of the teeth and are located near one edge of the respective tooth bands 12, 13 and 14. The opposite thin edges 25, 26 and 27 of the respective wedges are projected beyond the opposite edges of the respective tooth bands 12, 13 and 14 and are adapted to be inserted between the respective teeth and the gum portions 28, 29 and 30.

FIGURE 3 illustrates eruptive teeth 31 and 32 as they break through the gums 33 and 34 respectively. The dentist determines from his professional experience which tooth is to be guided, and applies the tooth band 13 to the tooth 16 with the wedge member 20 thereof located toward the eruptive tooth 31. The thin edge 26 is located between the teeth 16 and 31. The eruptive tooth 31 is guided through the eruptive growth thereof until it meshes with the lower tooth 32 as illustrated in FIGURE 4.

My wedge member is preferably used and illustrated to guide molar teeth but is equally adapted to guide other types of teeth in a similar manner such as first and second teeth of children.

In FIGURES 7, 8 and 9 I illustrate a detailed wedge member 35 showing a modification of the means for securing it to the band with connection flanges 36 and 37 extended from the sides 38 and 39. The connection flanges 36 and 37 are adapted for the convenience of welding them to a tooth band.

I claim:

A distal guide which is designed for an adjacent eruptive tooth, the distal guide comprising in combination:

(a) a band securable around a tooth adjacent an eruptive tooth,
(b) a wedge member,
(c) said wedge member having a greater length than the width of said band,
(d) said wedge member being secured transversely to the outer face of said band with the thickest portion thereof being located near one edge of said band and the wedge member being adapted to be positioned toward an eruptive tooth,
(e) and the thinnest edge of said wedge member being extended beyond the opposite edge of said band and adapted to be inserted between the tooth to be banded and the gum surrounding the banded tooth.

References Cited in the file of this patent

FOREIGN PATENTS 463,381    Germany _____ July 27, 1928